United States Patent
Wolters et al.

(10) Patent No.: US 6,269,106 B1
(45) Date of Patent: Jul. 31, 2001

(54) METHOD TO PROVIDE INFORMATION CONCERNING A FREQUENCY BAND, A HEAD-END, A NETWORK TERMINATOR AND A TERMINAL REALIZING SUCH A METHOD AND A COMMUNICATION ACCESS NETWORK INCLUDING SUCH A HEAD-END, SUCH A NETWORK TERMINATOR AND SUCH A TERMINAL

(75) Inventors: Robert Peter Christina Wolters, AC Montfort (NL); Harry Franciscus Ludovica Vanhoof, Lille (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/111,606

(22) Filed: Jul. 7, 1998

(30) Foreign Application Priority Data

Jul. 10, 1997 (EP) .................................................. 97401708

(51) Int. Cl.[7] ...................................................... H04B 3/10

(52) U.S. Cl. ........................................... 370/491; 370/500

(58) Field of Search .................................. 370/491, 500, 370/216; 455/2.01; 59/124, 326

(56) References Cited

U.S. PATENT DOCUMENTS

| | | | |
|---|---|---|---|
| 3,622,707 | * 11/1971 | Golembeski | 370/216 |
| 4,064,460 | * 12/1977 | Gargini | 455/2.01 |
| 5,162,937 | * 11/1992 | Heidemann et al. | 359/124 |
| 5,515,199 | * 5/1996 | Farina | 359/326 |

FOREIGN PATENT DOCUMENTS 3134219    3/1983   (DE) .

OTHER PUBLICATIONS

Document #IEEE802.14–95/156, Nov. 6, 1995 "Protocol Stack and Topology Assumptions for MLMP and MLAP Proposals" R. Norman.

(List continued on next page.)

Primary Examiner—Salvatore Cangialosi (57) ABSTRACT

A method to provide information in a communication access network which includes a plurality of terminals (T12, T12, T13, . . . , T31, . . . ) and a head-end (HE). The head-end (HE) includes transceivers (TRX1, TRX2, TRX3, . . . ) and is downstream coupled to each one of the terminals via a downstream common link (Lc) and a tree-like distributive network. Each transceiver provides to a combiner (COMB) included in the head-end (HE) a downstream signal (Sd1, Sd2, Sd3, . . . ) in a frequency band (CH1, CH2, CH3, . . . ) associated to the transceivers (TRX1, TRX2, TRX3, . . . ). The downstream signals (Sd1, Sd2, Sd3, . . . ) are together combined into a downstream modulated signal (S-MOD) which is broadcasted from the head-end (HE) to the terminals. A first one (T12) of the terminals is upstream coupled to a first transceiver (TRX1) via an upstream link. The information is provided to the first terminal and concerns a filter frequency band (CH1) which is a first one of the frequency bands which has to be used by the first terminal to filter out of the downstream modulated signal a regenerated downstream signal associated to a first one (Sd1) of the downstream signals provided by the first transceiver (TRX1). The method inserts a pilot tone signal (P1i, P1j, P1k) in the downstream modulated signal within a predefined pilot tone frequency band (CHp1i). The pilot tone signal (P1i, P1j, P1k) includes the information concerning the first frequency band and the method filters out of the downstream modulated signal by the terminal with a derived frequency band (CHd1i, CHd1j, CHd1k) which is derived of the predefined pilot tone frequency band (CHp1i, CHp1j, CHP1k) the pilot tone signal (P1i, P1j, P1k).

14 Claims, 2 Drawing Sheets

OTHER PUBLICATIONS

Patent Abstracts of Japan, vol. 16, No. 526 (E–1286) Oct. 28, 1992 & JP04196792A (Matsushita Electric Ind. Co. Ltd.).

Patent Abstracts of Japan, vol. 95, No. 011 Dec. 26, 1995 & JP07226718A (NEC Corp.).

"Performance of Multiple Access WDM Networks with Subcarrier Multiplexed Control Channels" Shing Fong Su, et al.

Journal of Lightwave Technology, vol. 11, No. 5/6, May/Jun. 1993, pp. 1028–1033.

* cited by examiner

Fig 1

METHOD TO PROVIDE INFORMATION CONCERNING A FREQUENCY BAND, A HEAD-END, A NETWORK TERMINATOR AND A TERMINAL REALIZING SUCH A METHOD AND A COMMUNICATION ACCESS NETWORK INCLUDING SUCH A HEAD-END, SUCH A NETWORK TERMINATOR AND SUCH A TERMINAL

BACKGROUND OF THE INVENTION

1. Technical Field

The present invention relates to a method to provide information, a head-end and a network terminator to provide such information and a terminal to receive information realizing such a method and a communication access network including such a head-end or such a network terminator or such a terminal.

2. Discussion of Related Art

Such a communication access network including such a terminal, such a network terminator and such a head-end is already known in the art, e.g. from the submission of "IEEE802.14-95/156, published in Nov. 6, 1995, *Protocol Stack and Topology Assumptions for Medium Access Controller (MAC) Level Management Protocol (MLMP) and Medium Access Controller (MAC) Level Access Protocol (MLAP)* ". This submission is provided by the IEEE Project 802.14 Working Group/Standard Protocol for Cable—TV Based Broadband Communication Network. Therein a few topology's of multiple communication access networks are introduced, more particular on pages 11, 13 and 15.

In order to indicate the background art which can be regarded as useful for understanding the invention a description is given of the necessary features of the topology of such a communication access network wherein the invention is used.

Such a communication access network includes a head-end and a plurality of terminals. The head-end and each one of the plurality of terminals are communicating with each other by transmitting downstream and upstream information to each other.

In the downstream direction, the head-end is coupled to the plurality of terminals via a downstream common link and a tree-like distributive network. The head-end includes a plurality of transceivers. Each transceiver receives information from the network which is coupled to this communication access network. Such kind of network is e.g. an asynchronous transfer mode network or a synchronous digital hierarchical network and provides information of e.g. a multimedia server or from a router to an internet provider or information from an other access network. It has to be remarked that the kind of network coupled to a communication access network wherein the invention is used and the kind of information provided by the network coupled to the communication access network of the invention are both no limitation on the invention as such. The aim is that each transceiver included in the head-end receives information. The information received by one of the transceivers is provided by this transceiver in a predefined frequency band to a combiner. The predefined frequency band is associated to this transceiver. In this way the combiner receives a plurality of downstream signals, each one being provided in a different frequency band. The combiner combines all the downstream signals together into one downstream modulated signal. This downstream modulated signal is broadcasted from the head-end to the plurality of terminals.

In the upstream direction each terminal is coupled to one of the plurality of transceivers included in the head-end via an upstream link. This means that each transceiver has its upstream link and that each terminal has access to the head-end via one of these links.

It has to be remarked that a plurality of terminals might have upstream access to one and the same transceiver via one and the same upstream link whereby e.g. in a time division multiple access network terminator a time division multiple access system is used to give access to this upstream link for each one of the plurality of terminals. However, it will be obvious to a person skilled in the art that this feature is not a necessary feature and that this feature gives no restriction on the scope of the invention. The aim of the topology of a communication access network wherein the invention is used is: at least one multiplexed downstream signal and different upstream links for terminals coupled to different transceivers.

Since a terminal included in a communication access network as described above is only able to transmit information to the transceiver whereto this terminal is upstream coupled, this terminal needs to know which downstream frequency band belongs to its transceiver in order to be able to filter out of the modulated downstream signal a regenerated downstream signal with this downstream frequency band and to have a proper communication with its transceiver. Indeed, without prior knowledge of the configuration of the transceivers i.e. the assignment of the frequency bands to the transceivers, a situation can occur in which a terminal will react on a downstream signal included in the downstream modulated signal coming from another transceiver than the one that is receiving the upstream information of the terminal. Such a situation can cause an interruption or interference of other transmissions being performed by another terminal connected to another transceiver. Such situations should be prevented. By using the preassigned frequency band of its transceiver to filter out of the received modulated downstream signal a regenerated downstream signal which is associated to the downstream signal provided by its transceiver, the terminal is enabled to communicate with its transceiver in a proper way.

An obvious way to give this knowledge to a terminal of an end-user who likes to establish a communication and to have access to the communication access network is to tune the filter of the terminal to the frequency band according to information given to the end-user by e.g. an operator of the communication access network at e.g. installation time of the terminal.

However, a problem outstanding with this method to provide information concerning a filter frequency band is that each terminal has a different installation configuration according to its transceiver whereto the terminal is upstream coupled. In the event when e.g. such a communication access network needs to be reconfigured due to e.g. an increasing number of terminals coupled to the communication access network and an increasing number of transceivers, new different frequency bands have to be given to the end-users and each terminal needs to be reconfigured on a different new frequency band.

DISCLOSURE OF INVENTION

An object of the present invention is to provide a method to provide information concerning a filter frequency band to be used by a first terminal such as the above known method but which has not the above drawback of a different installation configuration for each terminal with reconfiguration of the communication access network.

In accord with a first aspect of the invention, a method for use in a communication access network, said communication access network including a plurality of terminals and a head-end which includes a plurality of transceivers, said head-end being downstream coupled to each one of said plurality of terminals via downstream common link and a tree-like distributive network, each one of said plurality of transceivers providing one of a plurality of downstream signals, in one of a plurality of frequency bands associated to said one of said plurality of transceivers to a combiner included in said head-end, said plurality of downstream signals being together combined by said combiner into a downstream modulated signal, said downstream modulated signal being broadcasted from said head-end to said plurality of terminals, a first one of said plurality of terminals being upstream coupled to a first one of said plurality of transceivers via an upstream link, said method being to provide information to said first terminal concerning a filter frequency band being a first one of said plurality of frequency bands and to be used by said first terminal to filter out of said downstream modulated signal a first regenerated downstream signal associated to a first one of said downstream signals provided by said first transceiver, is characterized in that said method includes the steps of:

a) inserting at least one pilot tone signal in said downstream modulated signal, each pilot tone signal of said at least one pilot tone signal being inserted in a predefined pilot tone frequency band of at least one pilot tone frequency band, said at least one pilot tone signal including said information concerning said first frequency band; and b) filtering out of said downstream modulated signal by said terminal with a derived frequency band said at least one pilot tone signal, said derived frequency band being derived from said at least one predefined pilot tone frequency band.

According to a second aspect of the invention, a first terminal for inclusion in a communication access network and adapted to receive information and being a first one of a plurality of terminals included in said communication access network, said communication access network including a head-end which includes a plurality of transceivers and which is downstream coupled to each one of said plurality of terminals via a downstream common link and a tree-like distributive network, each one of said plurality of transceivers being adapted to provide one of a plurality of downstream signals in one of a plurality of frequency bands associated to said one of said plurality of transceivers to a combiner included in said head-end, said combiner being adapted to combine together said plurality of downstream signals into a downstream modulated signal which is broadcasted from said head-end to said plurality of terminals, said first terminal being coupled to a first one of said plurality of transceivers via an upstream link, said information being provided by said head-end to said first terminal and concerning a filter frequency band being a first one of said plurality of frequency bands to be used by said first terminal to filter out of said modulated signal a first regenerated downstream signal which is associated to a first one of said downstream signals provided by said first transceiver, is characterized in that said first terminal further includes:

first filter means to filter out of said received downstream modulated signal with a derived frequency band an at least one pilot tone signal which includes said information concerning said first frequency and each one of said at least one pilot tone signal being inserted into said downstream modulated signal in a predefined pilot tone frequency band of at least one pilot tone frequency band and whereby said derived frequency band is derived of said at least one predefined pilot tone frequency band.

Indeed at initialization time of a terminal i.e. a terminal willing to get access to the communication access system, by executing the following steps:

inserting in the downstream modulated signal a pilot tone in a predefined pilot tone frequency band and including the information concerning the frequency band to be used by a terminal in the pilot tone; and filtering of the pilot tone out of the downstream modulated signal by the terminal with a derived frequency band which is derived of the predefined pilot tone frequency band;

the terminal is aware of the information concerning the frequency band it has to use in order to receive the downstream signal coming from its transceiver.

In the event when e.g. the derived frequency band is substantially equal to the predefined pilot tone frequency band of its pilot tone signal, each terminal has to filter out in its own pilot tone frequency band its own pilot tone and knows, following the information included in its pilot tone, in which frequency band the information of its transceiver is modulated. In this way, each transceiver is associated to a pilot tone frequency band.

Moreover, at reconfiguration time of the communication access network, the information included in the different pilot tones is also reconfigured whereby the above association is also reconfigured. In the event when e.g. a terminal is upstream coupled to a first transceiver and due to a reconfiguration becomes to be upstream coupled to a second transceiver, the terminal will still filter out in its derived pilot tone frequency band its pilot tone signal but the terminal will receive now the reconfigured information i.e. the second frequency band and will use the second frequency band in order to get access to the system. In this way, no reconfigured frequency band information has to be provided to the end-users in order to be tuned on its terminal.

It has to be remarked that the information concerning the first frequency band is included in a pilot tone signal but that however also a combination of pilot tone signals is possible to include the concerned information. This feature is included in the claims of this invention by using the expression "at least one pilot tone signal". In order not to overload the description of the present invention, the following paragraphs mention only "a pilot tone" whereby it has to be understood that also a combination of pilot tones is possible.

It also has to be remarked that the information concerning the first frequency band which is included in a pilot tone signal, can be included in different ways but is no restriction to the scope of the invention. Two possible ways of implementation are described here below:

the value of a start frequency and an end frequency which together determine the frequency band are included in the pilot tone signal;

a reference e.g. a number represented by e.g. means of the amplitude of the pilot tone is included in the pilot tone and due to a predefined association in the terminal, represented e.g. by memory means with an association table, the terminal knows to which frequency band the number belongs.

In further accord with the first aspect of the present invention, the method is further characterized in that the step (a) is realized by generating the at least one pilot tone signal in the head-end and by modulating the at least one pilot tone signal together with the downstream signals by the combiner into the downstream modulated signal. This can be realized by a head-end according to a third aspect of the present invention described below and by means of the terminal described above according to the second aspect of the invention.

According to said third aspect of the present invention, a head-end for inclusion in a communication access network and adapted to provide information, said head-end including a plurality of transceivers and being downstream coupled to each one of a plurality of terminals included in said communication access network via a downstream common link and a tree-like distributive network, each one of said plurality of transceivers being adapted to provide one of a plurality of downstream signals in one of a plurality of frequency bands associated to said one of said plurality of transceivers to a combiner included in said head-end, said combiner being adapted to modulate said plurality of downstream signals together into a downstream modulated signal which is broadcasted from said head-end to said plurality of terminals, a first one of said plurality of terminals being coupled to a first one of said plurality of transceivers via an upstream link, said information being provided to said first terminal and concerning a filter frequency band being a first one of said plurality of frequency bands to be used by said first terminal to filter out of said downstream modulated signal a first regenerated downstream signal being associated to a first one of said downstream signals provided by said first transceiver, is characterized in that said head-end further includes:

first generating means coupled to said combiner and included to generate at least one pilot tone signal including said information concerning said first frequency band for application to said combiner of each pilot tone signal of said at least one pilot tone signal in a predefined pilot tone frequency band of at least one pilot tone frequency band and thereby enabling said combiner to modulate said at least one pilot tone signal together with said downstream signals into said downstream modulated signal which thereby enables said terminal, upon receiving of said downstream modulated signal to filter out of said downstream modulated signal with a derived frequency band said at least one pilot tone signal, said derived frequency band being derived of said at least one predefined pilot tone frequency band.

Therein, the insertion of the pilot tone in the downstream modulated signal is realized in the head-end according to the third aspect of the invention of the communication access network. Indeed, by generating the different pilot tones in first generating means included in the head-end and by providing these different pilot tones in the predefined different pilot tone frequency bands to the combiner included in the head-end, the pilot tone signals are combined together with the plurality of downstream signals into the downstream modulated signal, whereby insertion of the pilot tones is realized.

Still considering this fictive situation wherein the pilot tone signals are inserted by the head-end a prefiltering is realized with a network terminator included in the communication access network which provides the advantage of being able to filter out of the downstream modulated signal a pilot tone signal with the same derived frequency band for a plurality of terminals, which is an important advantage towards production of the terminals. Indeed, by coupling a network terminator in the downstream direction between the combiner of the head-end and the terminal, the network terminator is able to suppress in a predefined global pilot tone frequency band all unwanted signals e.g. other pilot tone signals of other transceivers, except the pilot tone signal included in the predefined pilot tone frequency band associated to the transceiver of the terminal or of the plurality of terminals whereto the network terminator is coupled. In this way, a terminal only has to search for a pilot tone in the predefined global pilot tone frequency band in order to pick up the only left pilot tone signal which is his pilot tone signal.

It has to be remarked that for a plurality of terminals which are all coupled in the downstream direction to the same network terminator and which are using upstream e.g. a time division multiple access system, the same unwanted signals have to be suppressed and the same pilot tone signal have to be left. This feature of the present invention is described in the method of the first aspect of the invention which is realized with the head-end of the third aspect of the invention, the first network terminator of a fourth aspect of the invention described below and the first terminal of according to the second aspect of the invention.

According to the fourth aspect of the present invention, a first network terminator for inclusion in a communication access network and adapted to provide information, said communication access network including a head-end which includes a plurality of transceivers and which is downstream coupled to each one of said plurality of terminals via a downstream common link and a tree-like distributive network, each one of said plurality of transceivers being adapted to provide one of a plurality of downstream signals, in one of a plurality of frequency bands associated to said one of said plurality of transceivers to a combiner included in said head-end, said combiner being adapted to combine together said plurality of downstream signals into a downstream modulated signal which is broadcasted from said head-end to said plurality of terminals, said first network terminator being downstream coupled between said combiner and a first terminal, said first terminal being coupled to a first one of said plurality of transceivers via an upstream link, said information being provided to said first terminal and concerning a filter frequency band being a first one of said plurality of frequency bands to be used by said first terminal to filter out of said modulated signal a first regenerated downstream signal which is associated to a first one of said downstream signals provided by said first transceiver, is characterized in that said first network terminator includes:

suppressing means included to suppress in a predefined global pilot tone frequency band of said downstream modulated signal unwanted signals, said modulated signal including at least one pilot tone signal which is inserted by said head-end, each pilot tone signal of said at least one pilot tone signal being inserted in a predefined pilot tone frequency band of at least one pilot tone frequency band and said at least one pilot tone signal including said information concerning said first frequency band, said predefined global pilot tone frequency band including at least said at least one pilot tone frequency band, said unwanted signals being signals which are modulated in said predefined global pilot tone frequency band and not being said at least one pilot tone signal, and thereby enabling said terminal to filter out of said downstream modulated signal with a derived frequency band, which is derived of said at least one predefined pilot tone frequency band and which is substantially equal to said predefined global pilot tone frequency band, said at least one pilot tone signal.

A second specific implementation of the method of the first aspect of the present invention is characterized in that said step a) further includes generating with second generating means said at least one pilot tone signal in a network terminator under control of at least one pilot tone control signal provided from said head-end to said network terminator and including said information concerning said first frequency band, said network terminator being included in said communication access network and being downstream coupled between said combiner and said first terminal; and by inserting with a network terminator modulator included in said network terminator said at least one pilot tone signal into said downstream modulated signal within said at least one pilot tone frequency band.

This second specific implementation according to the first aspect of the invention can be realized with a head-end according to a fifth aspect of the invention as follows. According to this fifth aspect of the invention, a head-end for inclusion in a communication access network is adapted to provide information wherein the head-end includes a plurality of transceivers downstream coupled to each one of a plurality of terminals included in said communication access network via a downstream common link and a tree-like distributive network, each one of said plurality of transceivers being adapted to provide one of a plurality of downstream signals in one of a plurality of frequency bands associated to said one of said plurality of transceivers to a combiner included in said head-end, said combiner being adapted to combine said plurality of downstream signals together into a downstream modulated signal which is broadcasted from said head-end to said plurality of terminals, a first one of said plurality of terminals being coupled to a first one of said plurality of transceivers via an upstream link, said information being provided to said first terminal and concerning a filter frequency band being a first one of said plurality of frequency bands to be used by said first terminal to filter out of said downstream modulated signal a first regenerated downstream signal being associated to a first one of said downstream signals provided by said first transceiver, is characterized in that said head-end further includes:

a control signal generator means included to generate at least one pilot tone control signal which includes said information concerning said first frequency band and to provide said at least one pilot tone control signal to a network terminator included in said communication access network and downstream coupled between said combiner and said first terminal and to thereby enable said network terminator to generate at least one pilot tone signal which includes said information concerning said first frequency band and to insert each pilot tone signal of said at least one pilot tone signal in said modulated downstream signal within a predefined pilot tone frequency band of at least one pilot tone frequency band and to thereby enable said first terminal to filter out of said downstream modulated signal with a derived frequency band which is derived of said at least one predefined pilot tone frequency band, said at least one pilot tone signal (Pi, Pj, Pk).

This second specific implementation of the method according to the first aspect of the invention can be further realized by a first network terminator according to a sixth aspect of the invention. According to the sixth aspect of the present invention, a first network terminator for inclusion in a communication access network and adapted to provide information, said communication access network including a head-end which includes a plurality of transceivers and which is downstream coupled to each one of said plurality of terminals via a downstream common link and a tree-like distributive network, each one of said plurality of transceivers being adapted to provide one of a plurality of downstream signals, in one of a plurality of frequency bands associated to said one of said plurality of transceivers to a combiner included in said head-end, said combiner being adapted to combine together said plurality of downstream signals into a downstream modulated signal which is broadcasted from said head-end to said plurality of terminals, said first network terminator being downstream coupled between said combiner and a first terminal, said first terminal being coupled to a first one of said plurality of transceivers via an upstream link, said information being provided to said first terminal and concerning a filter frequency band being a first one of said plurality of frequency bands to be used by said first terminal to filter out of said modulated signal a first regenerated downstream signal which is associated to a first one of said downstream signals provided by said first transceiver, is characterized in that said first network terminator includes:

second generating means included to generate, upon receiving of at least one pilot tone control signal including said information concerning said first frequency band from said head-end, at least one pilot tone signal including said information concerning said first frequency band for application to a network terminator modulator of each pilot tone signal of said at least one pilot tone signal in a predefined pilot tone frequency band of at least one pilot tone frequency band said network terminator modulator coupled to said second generating means and to said first terminal included to modulate said at least one pilot tone signal together with said downstream signals into said downstream modulated signal thereby enabling said terminal, upon receiving of said downstream modulated signal to filter out of said downstream modulated signal with a derived frequency band which is derived of said at least one predefined pilot tone frequency band, said at least one pilot tone signal.

Thereby, the insertion of a pilot tone in the downstream modulated signal is realized in a network terminator of the communication access network which is downstream coupled between the combiner of the head-end and the terminal. Indeed, by generating a pilot tone signal with second generating means of the network terminator under control of a pilot tone control signal which is provided from the head-end to the network terminator and which includes the information concerning the first frequency band, and by inserting with a network terminator modulator of the network terminator the generated pilot tone signal into the downstream modulated signal within a derived pilot tone frequency band which is derived of the pilot tone frequency band, the insertion of the pilot tone is realized.

Still considering this second situation wherein the pilot tone signals are inserted by the network terminator, insertion is realized of a pilot tone signal in a predefined global pilot tone frequency band which includes the different used pilot tone frequency bands and which carries only unwanted signals e.g. noise before inclusion of this pilot tone signal. This provides again the advantage of being able to filter out of the downstream modulated signal by the different terminals the different pilot tone signals with the same derived frequency band for all different terminal. Indeed, although that for different terminals coupled to different transceivers the inserted pilot tone signal is inserted in a different pilot tone frequency band, by inserting a pilot tone in a substantially empty predefined global frequency band, a terminal is enabled to filter out with this predefined global frequency band i.e. the derived frequency band, the only inserted pilot tone signal. This feature of the present invention is described in the method of the first aspect of the invention wherein it further includes the steps of including in said step a) said at least one pilot tone frequency band in a predefined global pilot tone frequency band, said predefined global pilot tone frequency band including at least said at least one pilot tone frequency band; and substantially equaling in said step b) said derived frequency band to said predefined global pilot tone frequency band. This can be realized with the head-end according to the fifth aspect of the invention, the first network terminator according to the sixth aspect of the invention and further characterized in that said at least one pilot tone frequency band is included in a predefined global pilot tone frequency band which includes at least said at least one pilot tone frequency band and which carries before said modulation of said network terminator modulator no signals and whereby said derived frequency band used by said first terminal is substantially equal to said predefined global pilot tone frequency band and the first terminal according to the second aspect of the invention characterized in that said derived frequency band used by said first filter means of said first terminal substantially equals to a predefined global pilot tone frequency band, said predefined global pilot tone frequency band being used by a network terminator included in said communication access network and being downstream coupled between said combiner and said first terminal and enabled to insert, upon receiving of at least one pilot tone control signal including said information concerning said first frequency from said head-end, at least one pilot tone signal including said information concerning said first frequency band, in said downstream modulated signal, each pilot tone signal of said at least one pilot tone signal being inserted in a predefined pilot tone frequency band of at least one pilot tone frequency band and said at least one pilot tone frequency band being included in said predefined global pilot tone frequency band which includes at least said at least one pilot tone frequency band.

Yet, another characteristic feature of the present method, is that the pilot tone signal additionally includes information concerning an upstream frequency band to be used by the terminal in order to transmit upstream signals. Indeed, towards implementation, it is practical that the head-end provides to the terminal also the upstream frequency band to be used by a particular terminal coupled to a particular transceiver. In this way, the transceiver can already be tuned to this frequency band. Once the information concerning the to be used downstream and upstream frequency band is exchanged a proper communication is installed between each other via these communication channels.

A communication access network can include any of the previous devices i.e. a head-end, a network terminator and a terminal according to the invention.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF PREFERRED EMBODIMENTS

Figure 1:
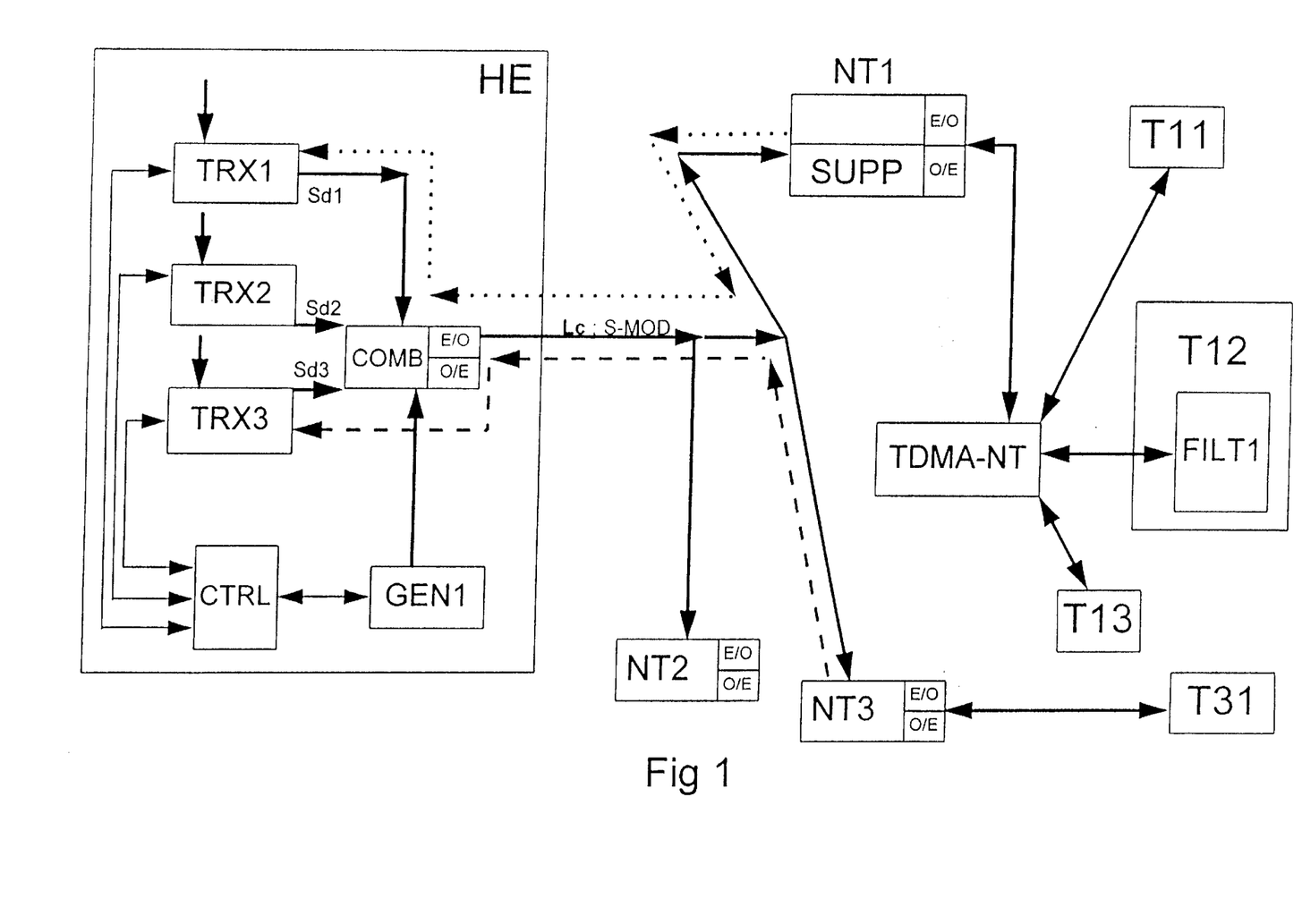
FIG. 1 is a block scheme of an embodiment of a communication access network according to the present invention.

Referring to FIG. 1 a communication access network will be described. First, the access communication network will be described by means of a description of the functional blocks included in the access communication network. Based on this description, implementation of the functional blocks in the figure will be evident to a person skilled in the art and will therefor not be described in detail. In addition the principle working of the method of the invention will be described in further detail.

The access communication network shown in FIG. 1 is a hybrid fiber coax network and includes a head-end HE, a plurality of network terminators NT1, NT2 and NT3 a time division multiple access network terminator TDMA-NT and a plurality of terminals T11, T12, T13, . . . , T31, . . . . In order not to overload the figure only a few terminals are shown i.e. those terminals T11, T12, T13, . . . , T31, . . . which are relevant to describe the principle working of the method of the invention.

First the links and functional blocks related to provide signals in the downstream direction will be explained, later on the upstream communication direction of the communication access network will be explained.

In the downstream direction, the head-end HE is coupled to the plurality of terminals via a downstream common link Lc and a tree-like distributive network. The tree like distributive network is shown in FIG. 1 with full lines with arrows in the downstream direction i.e. from the head-end HE, via one of the plurality of network terminators NT1, NT2, NT3 and onward via the time division multiple access network terminator TDMA-NT to eventually reach one of the plurality of terminals T11, T12, T13, . . . , T31, . . .

The head-end HE includes a plurality of transceivers TRX1, TRX2 and TRX3, a combiner COMB, a first generator GEN1 and a control manager CTRL.

Each transceiver TRX1, TRX2 and TRX3 receives information of an asynchronous transfer mode ATM network coupled to the communication access network of the invention. This means that each transceiver TRX1, TRX2 and TRX3 is coupled to this network. In order not to overload the figure, the ATM network is not shown, but the different links to this network are shown in FIG. 1 with vertical arrows ending at the different transceivers TRX1, TRX2 and TRX3. Each transceiver TRX1, TRX2 and TRX3 is coupled to the combiner COMB which is coupled to the downstream common link Lc.

The combiner COMB receives the information coming from the ATM network via the different transceivers TRX1, TRX2 and TRX3 in different frequency bands CH1, CH2 and CH3 respectively. This means that each transceiver TRX1, TRX2 and TRX3 has its associated frequency band CH1, CH2 and CH3. By this way, the combiner COMB receives a plurality of downstream signals Sd1, Sd2 and Sd3 each one being provided in a different frequency band CH1, CH2 and CH3. The combiner combines the received downstream signals Sd1, Sd2 and Sd3 together in one downstream modulated signal S-MOD which is downstream broadcasted in the communication access network via the downstream link Lc and the tree-like distributive network to the different terminals T11, T12, T13, . . . , T31, . . .

It has to be remarked that in this particular embodiment it is preferred to distribute the downstream modulated signal S-MOD over different physical mediums i.e. electrical and optical. Indeed the downstream modulated signal S-MOD is converted from an electrical signal into an optical signal in the combiner COMB just before leaving the head-end HE and is transmitted over optical fibers to the different network terminators NT1, NT2 and NT3. In the network terminators NT1, NT2 and NT3 the optical signal is again converted into an electrical signal. From the network terminators NT1, NT2 and NT3 the downstream modulated signal S-MOD is further distributed over coaxial cables towards the different terminals T11, T12, T13, . . . , T31, . . . .

It has to be remarked that all the terminals e.g. T11, T12 and T13 which are coupled to one and the same network terminator e.g. the first network terminator NT1 belong to the coax-cell of this first network terminator NT1.

The first generator GEN1 is coupled to the combiner COMB and to the control manager CTRL which is also coupled to the transceivers TRX1, TRX2 and TRX3. The first generator GEN1 is included to generate under control of the control manager CTRL pilot tone signals which include information concerning a frequency band e.g. P1i, P1j, P1k, P2i, . . . , P3k. In order not to overload FIG. 1 the pilot tone signals are not shown and in order not to overload this description it is preferred to use only one pilot tone for insertion of information of a frequency band. In this way:

pilot tone signal P1 includes the information concerning frequency band CH1; and pilot tone signal P2 includes the information concerning frequency band CH2; and pilot tone signal P3 includes the information concerning frequency band CH3.

For this embodiment it is preferred to determine the information concerning a frequency band which have to be provided to a terminal willing to log on to the communication system with a predefined number. The head-end HE, but also the different terminals T11, T12, T13, . . . , T31, . . . have the knowledge of the association of different predefined numbers to a frequency band. In this embodiment a first association is given:

number 1 is associated to frequencyband CH1; and number 2 is associated to frequencyband CH2; and number 3 is associated to frequencyband CH3.

It has to be remarked that even after reconfiguration of the communication access network this first association remains. This will be explained in a further paragraph.

In order not to overload the functional block of the head-end HE in FIG. 1, the memory included in the head-end HE with the knowledge of the above first association is not shown in FIG. 1. It has to be understood that the control manager works with the information included in this memory. For purposes of the figure, the control manager can be viewed as including the memory. In this way e.g. the first generator GEN1 generates pilot tone P1 which includes number 1 being predefined to be associated to frequency band CH1. The generated pilot tones . . . , P1, P2, P3, . . . are provided to the combiner COMB and are combined together with the downstream signals Sd1, Sd2, Sd3 into the modulated downstream signal S-MOD.

Figure 2A:
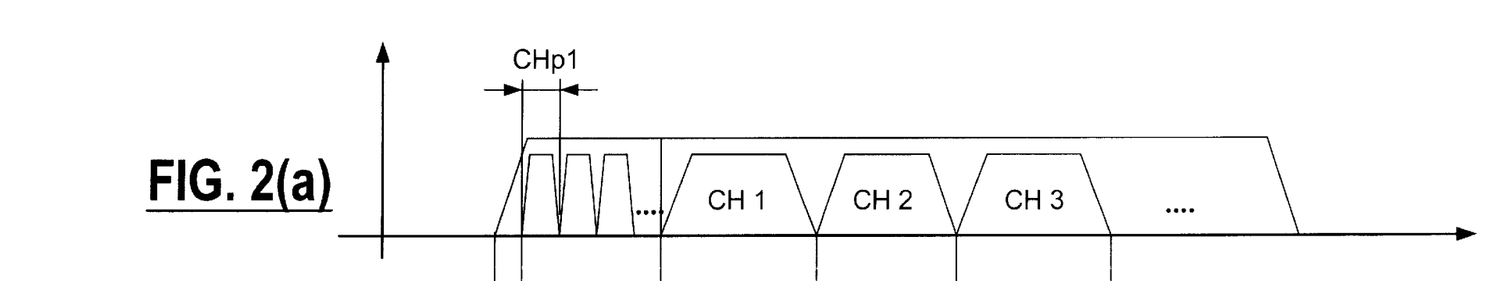
FIGS. 2(a) and 2(b) represent frequency lines showing the used frequency bands of the downstream modulated signal before and after passing a network terminator.

Referring to FIG. 2(a) the used frequency bands of the downstream modulated signal S-MOD are shown: the downstream signals Sd1, Sd2, and Sd3 are each occupying a downstream frequency band CH1, CH2 and CH3, respectively. The pilot tone signals P1, P2 and P3 are included in the pilot tone frequency bands CHp1, CHp2 and CHp3, respectively, which gives us a second association to be kept in the memory of the head-end HE e.g.

number 1 associated to frequency band CH1 is represented by pilot tone P1 included in pilot tone frequency band CHp1: number 1 is associated to pilot tone frequency band CHp1. This second association will be changed during a reconfiguration of the communication access network which will be explained in a further paragraph.

It should further be noted that the pilot tone frequency bands CHP1, CHp2 and CHp3 are included in a predefined global pilot tone frequency band CHp and that although for this embodiment it is preferred to choose all pilot tone frequency bands next to each other in one global pilot tone frequency band, the application of the present invention is not reduced to such methods to provide information. Indeed, small modifications, evident to a person skilled in the art, may be applied to this described embodiment to adapt it to realize a method to provided information according to the invention which inserts pilot tone signals in pilot tone frequency bands which are included in different pilot tone sub-frequency bands which are not located next to each other on a frequency line but which are constituting together the global pilot tone frequency band.

Referring back to FIG. 1, each one of the plurality of network terminators NT1, NT2 and NT3 includes suppressing means SUPP. In order not to overload FIG. 1 only the suppresser SUPP of network terminator NT1 is shown. The suppresser SUPP is for suppressing unwanted signals within the predefined global pilot tone frequency band CHp in the downstream modulated signal S-MOD, received from the head-end HE. It has to be understood that for e.g. network terminator NT1 unwanted signals can be different as for e.g. network terminator NT2. Indeed, the unwanted signals of a network terminator are all those signals within the predefined global pilot tone frequency band except the pilot tone signal which includes the frequency band information of the transceiver whereto the terminals coupled to this network terminator are upstream coupled. In this way the unwanted signals of network terminator NT1 are all those signals within the predefined global pilot tone frequency band CHp except the pilot tone signal P1 which includes the frequency band CH1 of the transceiver TRX1 whereto the terminals . . . , T11, T12, T13, . . . coupled to this network terminator NT1 are upstream coupled.

Figure 2B:
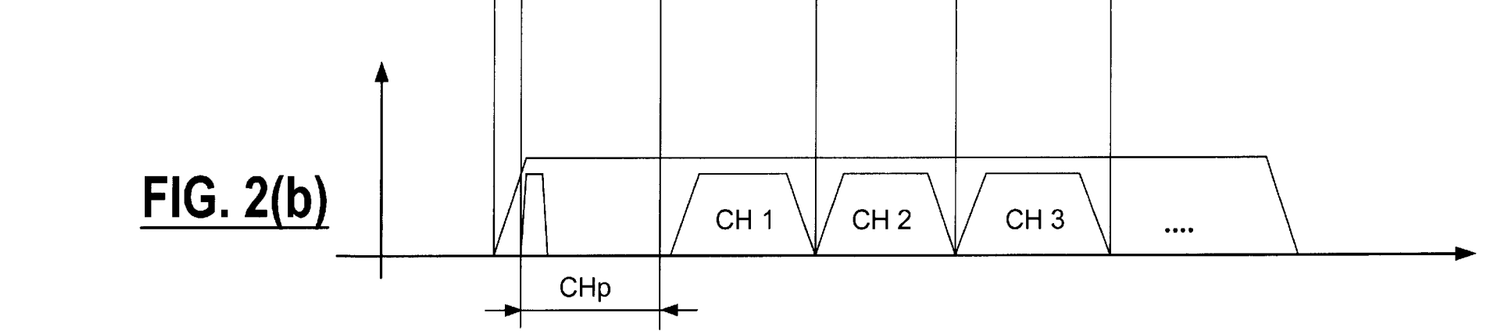

Referring to the lowest frequency line of FIG. 2(b) the occupied frequency bands of the downstream modulated signal S-MOD which has passed the suppresser SUPP of network terminator NT1 are shown. It can be seen that only in the pilot tone frequency band CHp1 of the predefined global pilot tone frequency band CHp the pilot tone signal P1 is still present. All the other signals within this predefined global pilot tone frequency band are suppressed by the suppresser SUPP. On the other hand, the modulated downstream signals Sd1, Sd2, Sd3, provided by the transceivers are unchanged and still present.

Referring back to FIG. 1, after having passed a network terminator the downstream modulated signal S-MOD is further distributed to the terminals. For the coax cell of the network terminator NT1 the downstream modulated signal S-MOD also goes via a time division multiple access network terminator TDMA-NT. This time division multiple access network terminator TDMA-NT has no functionality in the downstream direction. But it has to be remarked that the time division multiple access network terminator TDMA-NT provides in the upstream transmission direction the possibility for the terminals of its coaxcell to log on to the communication access network via a time division multiple access system. The inclusion of the time division multiple access network terminator TDMA-NT is only preferred in this embodiment in order to show that such an implementation is possible. Indeed, a person skilled in the art knows that the presence of a time division multiple access network terminator TDMA-NT is no restriction on the scope of the invention.

Each terminal includes a filter. In order not to overload FIG. 1 only the first filter FILT1 of terminal T12 is shown. The first filter FILT1 filters out the received downstream modulated signal S-MOD within the predefined global pilot tone frequency band CHp the only available pilot tone, which is in this case P1.

In the upstream direction, each terminal is coupled, via a time division multiple access network terminator and eventually a network terminator to a transceiver. However, the upstream links from the terminals up to the network terminator goes over coaxial cables which are used in two directions. This is shown with the same full line of the downstream transmission direction and accentuated with an arrow in the upstream direction from each terminal towards a network terminator.

Each network terminator is upstream coupled with a different upstream optical link to a predefined transceiver. In order not to overload FIG. 1, only two upstream links are shown:

network terminator NT1 is upstream coupled to transceiver TRX1 which is shown with a dotted line; and
network terminator NT3 is upstream coupled to transceiver TRX3 which is shown with a dashed line.

In this way, terminal T12 is upstream coupled to transceiver TRX1 only, which means that upstream signals will be received by only transceiver TRX1. In order to give reactions on a downstream signal coming from its transceiver, terminal T12 has to listen to the frequency band CH1.

In the following paragraph the principle working of the method of the invention will be described in further detail.

At the moment when terminal T12 is for instance switched on in order to get access to the communication access network it is necessary for the terminal T12 to know to which transceiver it is upstream coupled. Therefor, the first filter FILT1 starts searching for a pilot tone in the predefined global pilot tone frequency band CHp.

In the meantime, the first generator GEN1 generates the pilot tone P1 which includes number 1 which is, following the memory of the head-end, associated to the transceiver TRX1. The pilot tone P1 is combined together with other pilot tones and the downstream signals of the transceivers into the downstream modulated signal S-MOD. The pilot tone signal P1 is modulated within the pilot tone frequency band CHp1 which is the only not suppressed frequency band of the network terminator NT1 whereto terminal T12 is coupled. The distributed downstream modulated signal S-MOD passes the network terminator NT1 where all the signals within the predefined global pilot tone frequency band CHp are suppressed by the suppresser SUPP, except within pilot tone frequency band CHp1. The modulated downstream signal S-MOD is received by terminal T12 which finds within the predefined pilot tone frequency band CHp the single pilot tone signal P1. As already mentioned before, each terminal has the knowlegde of the association of a particular number included in a pilot tone signal to a particular frequency band. This knowledge is implemented by a memory (not shown in FIG. 1). After filtering out the first pilot tone P1, the included number is determined i.e. number 1 and the first frequency band is determined according to the association in the included memory, i.e. CH1. The filter frequency of the first filter FILT1 of terminal T12 is changed to the filter frequency CH1 whereby the terminal T12 is enabled to receive the downstream modulated signal Sd1 coming from transceiver TRX1. In the event when the terminal T12 reacts on information included in this downstream signal Sd1 by transmitting an upstream signal, this upstream signal is received by transceiver TRX1 and a communication between terminal T12 and transceiver TRX1 is established.

It has to be remarked that in the event of a reconfiguration of the communication access network the above first association will not be changed and the above second association will be changed. This will be explained with the following example.

Presume a reconfiguration of the above communication access network whereby the terminal T12 is to become upstream coupled, still via network terminator NT1, to transceiver TRX3. It has to be remarked that transceiver TRX3 still inserts its downstream signal Sd3 in frequency band CH3 which is the information concerning the frequency band to be provided to terminal T12. The functional blocks of the terminal T12 will not be changed. The terminal T12 will still search during access time for the only available pilot tone signal in the predefined global pilot tone frequency band CHp. Also the functional blocks in the network terminator NT1 will remain unchanged whereby a suppression of all signals except within pilot tone frequency band CHp1 is still executed. However, the content of the memory which keeps track of the second association in the head-end HE is changed. Indeed, not number 1 anymore but number 3 is now associated to pilot tone frequency band CHp1. Number 3 is included in the pilot tone signal which is modulated following the new content of the memory of the head-end HE within pilot tone frequency band CHp1 into the downstream modulated signal S-MOD. After the suppression in the network terminator NT1, the modulated downstream signal S-MOD is received by terminal T12 which finds within the predefined pilot tone frequency band CHp the single pilot tone signal which carries the number 3. Following that, in the memory of the terminal T12, the included number 3 is associated to the frequency band CH3. The filter frequency of the first filter FILT1 of terminal T12 is changed to the filter frequency CH3 whereby the terminal T12 is enabled to receive the downstream modulated signal Sd3 coming from transceiver TRX3. In this way, no reconfigured frequency band information has to be given to the end-users in order to be tuned on its terminal.

It has to be remarked that although in this preferred embodiment an upstream coupling of the terminals via a network terminator is preferred, the application of the invention is not limited to methods which have an upstream coupling via a network terminator. Indeed, in other implementations of the invention e.g. when no network terminator is used or even in the event of the method described in this preferred embodiment, the network terminator has no active function regarding the actual invention in the upstream direction. So, referring for instance to the described embodiment but in the event that the upstream link of e.g. terminal T12 goes directly from the terminal T12 to the transceiver TRX1, the method of the present invention can still be used in order to provide to the terminal T12 the information concerning the frequency band.

It has to be remarked that the application of the invention is not limited to a hybrid fiber coax communication network as described in the chosen embodiment of the invention. Small modification, evident to a person skilled in the art, may be applied to the above described embodiment to adapt it to be integrated in other networks wherein information concerning a frequency band to be used has to be provided from a head-end to a terminal. Indeed, in distributive interactive telecommunication networks with the minimum features as the topology of the network described in the introductory part, the present invention is applicable.

It is further to be noticed that the term "including", used in the claims, should not be interpreted as being limitative to the means listed thereafter. Thus, the scope of the expression "a device including means A and means B" should not be limited to devices consisting only of components A and B. It means that with respect to the present invention, the only relevant components of the devices are A and B.

Similarly, it is to be noticed that the term "coupled", also used in the claims, should not be interpreted as being limitative to direct connection only. Thus, the scope of the expression "a device A coupled to a device B" should not be limited to devices or systems wherein an output of device A is directly connected to an input of device B. It means that there exists a path between an output of A and an input of B which may be a path including other devices or means.

While the principles of the invention have been described above in connection with specific apparatus, it is to be clearly understood that this description is made only by way of example and not as a limitation on the scope of the invention, as defined in the appended claims.

What is claimed is:

1. A method for use in a communication access network, said communication access network including a plurality of terminals (T12, T12, T13, ..., T31, ...) and a head-end (HE) which includes a plurality of transceivers (TRX1, TRX2, TRX3, ...), said head-end (HE) being downstream coupled to each one of said plurality of terminals (T12, T12, T13, ..., T31, ...) via a downstream common link (Lc) and a tree-like distributive network, each one of said plurality of transceivers (TRX1, TRX2, TRX3, ...) providing one of a plurality of downstream signals (Sd1, Sd2, Sd3, ...), in one of a plurality of frequency bands (CH1, CH2, CH3, ...) associated to said one of said plurality of transceivers (TRX1, TRX2, TRX3, ...) to a combiner (COMB) included in said head-end (HE), said plurality of downstream signals (Sd1, Sd2, Sd3, ...) being together combined by said combiner (COMB) into a downstream modulated signal (S-MOD), said downstream modulated signal (S-MOD) being broadcasted from said head-end (HE) to said plurality of terminals (T12, T12, T13, ..., T31, ...), a first one (T12) of said plurality of terminals being upstream coupled to a first one (TRX1) of said plurality of transceivers via an upstream link, said method being to provide information to said first terminal (T12) concerning a filter frequency band (CH1) being a first one of said plurality of frequency bands (CH1, CH2, CH3, ...) and to be used by said first terminal (T12) to filter out of said downstream modulated signal (S-MOD) a first regenerated downstream signal associated to a first one (Sd1) of said downstream signals provided by said first transceiver (TRX1), and characterized in that said method includes the steps of:

a) inserting at least one pilot tone signal (P1i, P1j, P1k) in said downstream modulated signal (S-MOD), each pilot tone signal (P1i) of said at least one pilot tone signal (P1i, P1j, P1k) being inserted in a predefined pilot tone frequency band (CHp1i) of at least one pilot tone frequency band (CHp1i, CHp1j, CHp1k), said at least one pilot tone signal (P1i, P1j, P1k) including said information concerning said first frequency band (CH1); and b) filtering out of said downstream modulated signal (S-MOD) by said terminal (T12) with a derived frequency band (CHd1i, CHd1j, CHd1k) said at least one pilot tone signal (P1i, P1j, P1k), said derived frequency band (CHd1i, CHd1j, CHd1k) being derived from said at least one predefined pilot tone frequency band (CHp1i, CHp1j, CHp1k).

2. The method to provide information according to claim 1, characterized in that said step a) is realized by generating said at least one pilot tone signal (P1i, P1j, P1k) in said head-end (HE) and by modulating said at least one pilot tone signal (P1i, P1j, P1k) together with said downstream signals (Sd1, Sd2, Sd3, ...) by said combiner (COMB) into said downstream modulated signal (S-MOD).

3. The method to provide information according to claim 1, characterized in that said method further includes:

suppressing in a predefined global pilot tone frequency band (CHp) of said downstream modulated signal (S-MOD) by a first network terminator (NT1) unwanted signals, said predefined global pilot tone frequency band (CHp) including at least said at least one pilot tone frequency band (CHp1i, CHp1j, CHp1k), said unwanted signals being signals modulated in said predefined global pilot tone frequency band (CHp) but not being said at least one pilot tone signal (P1i, P1j, P1k), said network terminator (NT) being included in said communication access network and being downstream coupled between said combiner (COMB) and said first terminal (T12); and substantially equaling in said step b) said derived frequency band (CHd1i, CHd1j, CHd1k) to said predefined global pilot tone frequency band (CHp).

4. The method to provide information according to claim 1 characterized in that said step a) further includes generating with second generating means (GEN2) said at least one pilot tone signal (P1i, P1j, P1k) in a network terminator (NT1) under control of at least one pilot tone control signal (Cp1i, Cp1j, Cp1k) provided from said head-end (HE) to said network terminator (NT1) and including said information concerning said first frequency band (CH1), said network terminator (NT1) being included in said communication access network and being downstream coupled between said combiner (COMB) and said first terminal (T12); and by inserting with a network terminator modulator (MOD1) included in said network terminator (NT1) said at least one pilot tone signal (P1i, P1j, P1k) into said downstream modulated signal (S-MOD) within said at least one pilot tone frequency band (CHp1i, CHp1j, CHp1k).

5. The method to provide information according to claim 1 characterized in that said method further includes:

including in said step a) said at least one pilot tone frequency band (CHp1i, CHp1j, CHp1k) in a predefined global pilot tone frequency band (CHp), said predefined global pilot tone frequency band (CHp) including at least said at least one pilot tone frequency band (CHp1i, CHp1j, CHp1k); and substantially equaling in said step b) said derived frequency band (CHd1i, CHd1j, CHd1k) to said predefined global pilot tone frequency band (CHp).

6. The method to provide information according to claim 1, characterized in that said at least one pilot tone signal (P1i, P1j, P1k) additionally includes information concerning a first upstream frequency band to be used by said first terminal (T12) in order to transmit an upstream first signal via said upstream link.

7. A head-end (HE) for inclusion in a communication access network and adapted to provide information, said head-end (HE) including a plurality of transceivers (TRX1, TRX2, TRX3, . . . ) and being downstream coupled to each one of a plurality of terminals (T12, T12, T13, . . . , T31, . . . ) included in said communication access network via a downstream common link (Lc) and a tree-like distributive network, each one of said plurality of transceivers (TRX1, TRX2, TRX3, . . . ) being adapted to provide one of a plurality of downstream signals (Sd1, Sd2, Sd3, . . . ) in one of a plurality of frequency bands (CH1, CH2, CH3, . . . ) associated to said one of said plurality of transceivers (TRX1, TRX2, TRX3, . . . ) to a combiner (COMB) included in said head-end (HE), said combiner (COMB) being adapted to modulate said plurality of downstream signals (Sd1, Sd2, Sd3, . . . ) together into a downstream modulated signal (S-MOD) which is broadcasted from said head-end (HE) to said plurality of terminals (T12, T12, T13, . . . , T31, . . . ), a first one (T12) of said plurality of terminals being coupled to a first one (TRX1) of said plurality of transceivers via an upstream link, said information being provided to said first terminal (T12) and concerning a filter frequency band being a first one (CH1) of said plurality of frequency bands (CH1, CH2, CH3, . . . ) to be used by said first terminal (T12) to filter out of said downstream modulated signal (S-MOD) a first regenerated downstream signal being associated to a first one (Sd1) of said downstream signals provided by said first transceiver (TRX1), characterized in that said head-end (HE) further includes:

first generating means (GEN1) coupled to said combiner (COMB) and included to generate at least one pilot tone signal (P1i, P1j, P1k) including said information concerning said first frequency band (CH1) for application to said combiner (COMB) of each pilot tone signal (P1i) of said at least one pilot tone signal (P1i, P1j, P1k) in a predefined pilot tone frequency band (CHp1i) of at least one pilot tone frequency band (CHp1i, CHp1j, CHp1k) and thereby enabling said combiner (COMB) to modulate said at least one pilot tone signal (P1i, P1j, P1k) together with said downstream signals (Sd1, Sd2, Sd3, . . . ) into said downstream modulated signal (S-MOD) which thereby enables said terminal (T12), upon receiving of said downstream modulated signal (S-MOD) to filter out of said downstream modulated signal (S-MOD) with a derived frequency band (CHd1i, CHD1j, CHd1k) said at least one pilot tone signal (P1i, P1j, P1k), said derived frequency band (CHd1i, CHd1j, CHd1k) being derived of said at least one predefined pilot tone frequency band (CHp1i, CHp1j, CHp1k).

8. A first terminal (T12) for inclusion in a communication access network and adapted to receive information and being a first one of a plurality of terminals (T12, T12, T13, . . . , T31, . . . ) included in said communication access network, said communication access network including a head-end (HE) which includes a plurality of transceivers (TRX1, TRX2, TRX3, . . . ) and which is downstream coupled to each one of said plurality of terminals (T12, T12, T13, . . . , T31, . . . ) via a downstream common link (Lc) and a tree-like distributive network, each one of said plurality of transceivers (TRX1, TRX2, TRX3, . . . ) being adapted to provide one of a plurality of downstream signals (Sd1, Sd2, Sd3, . . . ) in one of a plurality of frequency bands (CH1, CH2, CH3, . . . ) associated to said one of said plurality of transceivers (TRX1, TRX2, TRX3, . . . ) to a combiner (COMB) included in said head-end (HE), said combiner (COMB) being adapted to combine together said plurality of downstream signals (Sd1, Sd2, Sd3, . . . ) into a downstream modulated signal (S-MOD) which is broadcasted from said head-end (HE) to said plurality of terminals (T12, T12, T13, . . . , T31, . . . ), said first terminal (T12) being coupled to a first one (TRX1) of said plurality of transceivers via an upstream link, said information being provided by said head-end (HE) to said first terminal (T12) and concerning a filter frequency band (CH1) being a first one of said plurality of frequency bands (CH1, CH2, CH3, . . . ) to be used by said first terminal (T12) to filter out of said modulated signal (S-MOD) a first regenerated downstream signal which is associated to a first one (Sd1) of said downstream signals provided by said first transceiver (TRX1), characterized in that said first terminal (T12) further includes:

first filter means (FILT1) to filter out of said received downstream modulated signal (S-MOD) with a derived frequency band (CHd1i, CHd1j, CHd1k) an at least one pilot tone signal (P1i, P1j, P1k) which includes said information concerning said first frequency (CH1) and each one (P1i) of said at least one pilot tone signal (P1i, P1j, P1k) being inserted into said downstream modulated signal (S-MOD) in a predefined pilot tone frequency band (CHp1i) of at least one pilot tone frequency band (CHp1i, CHp1j, CHp1k) and whereby said derived frequency band (CHd1i, CHd1j, CHd1k) is derived of said at least one predefined pilot tone frequency band (CHp1i, CHp1j, CHp1k).

9. A first network terminator (NT1) for inclusion in a communication access network and adapted to provide information, said communication access network including a head-end (HE) which includes a plurality of transceivers (TRX1, TRX2, TRX3, . . . ) and which is downstream coupled to each one of said plurality of terminals (T12, T12, T13, . . . , T31, . . . ) via a downstream common link (Lc) and a tree-like distributive network, each one of said plurality of transceivers (TRX1, TRX2, TRX3, . . . ) being adapted to provide one of a plurality of downstream signals (Sd1, Sd2, Sd3, . . . ), in one of a plurality of frequency bands (CH1, CH2, CH3, . . . ) associated to said one of said plurality of transceivers (TRX1, TRX2, TRX3, . . . ) to a combiner (COMB) included in said head-end (HE), said combiner (COMB) being adapted to combine together said plurality of downstream signals (Sd1, Sd2, Sd3, . . . ) into a downstream modulated signal (S-MOD) which is broadcasted from said head-end (HE) to said plurality of terminals (T12, T12, T13, . . . , T31, . . . ), said first network terminator (NT1) being downstream coupled between said combiner (COMB) and a first terminal (T12), said first terminal (T12) being coupled to a first one (TRX1) of said plurality of transceivers via an upstream link, said information being provided to said first terminal (T12) and concerning a filter frequency band (CH1) being a first one of said plurality of frequency bands (CH1, CH2, CH3, . . . ) to be used by said first terminal (T12) to filter out of said modulated signal (S-MOD) a first regenerated downstream signal which is associated to a first one (Sd1) of said downstream signals provided by said first transceiver (TRX1), characterized in that said first network terminator (NT1) includes:

suppressing means (SUPP) included to suppress in a predefined global pilot tone frequency band (CHp) of said downstream modulated signal (S-MOD) unwanted signals, said downstream modulated signal (S-MOD) including at least one pilot tone signal (P1i, P1j, P1k) which is inserted by said head-end (HE), each pilot tone signal (P1i) of said at least one pilot tone signal (P1i, P1j, P1k) being inserted in a predefined pilot tone frequency band (CHp1i) of at least one pilot tone frequency band (CHp1i, CHp1j, Chp1k) and said at least one pilot tone signal (P1i, P1j, P1k) including said information concerning said first frequency band (CH1), said predefined global pilot tone frequency band (CHp) including at least said at least one pilot tone frequency band (CHp1i, CHp1j, Chp1k), said unwanted signals being signals which are modulated in said predefined global pilot tone frequency band (CHp) and not being said at least one pilot tone signal (P1i, P1j, P1k), and thereby enabling said terminal (T12) to filter out of said downstream modulated signal (S-MOD) with a derived frequency band (CHd1i, CHd1j, CHd1k), which is derived of said at least one predefined pilot tone frequency band (CHp1i, CHp1j, CHp1k) and which is substantially equal to said predefined global pilot tone frequency band (CHp), said at least one pilot tone signal (P1i, P1j, P1k).

10. The first terminal (T12) to receive information according to claim 8, characterized in that said derived frequency band (Chd1i, CHd1j, CHd1k) used by said first filter means (FILT1) of said first terminal (T12) substantially equals to a predefined global pilot tone frequency band (CHp) including at least said at least one pilot tone frequency band (CHp1i, CHp1j, CHp1k), said predefined global pilot tone frequency band (CHp) being used by a network terminator (NT) which is included in said communication access network being downstream coupled between said combiner (COMB) and said first terminal (T12) and which is included to suppress unwanted signals of said downstream modulated signal (S-MOD) in said predefined global pilot tone frequency band (CHp), said unwanted signals being signals which are modulated in said predefined global pilot tone frequency band (CHp) and which are not said at least one pilot tone signal (P1i, P1j, P1k).

11. A head-end (HE) for inclusion in a communication access network and adapted to provide information, said head-end (HE) including a plurality of transceivers (TRX1, TRX2, TRX3, . . . ) and being downstream coupled to each one of a plurality of terminals (T12, T12, T13, . . . , T31, . . . ) included in said communication access network via a downstream common link (Lc) and a tree-like distributive network, each one of said plurality of transceivers (TRX1, TRX2, TRX3, . . . ) being adapted to provide one of a plurality of downstream signals (Sd1, Sd2, Sd3, . . . ) in one of a plurality of frequency bands (CH1, CH2, CH3, . . . ) associated to said one of said plurality of transceivers (TRX1, TRX2, TRX3, . . . ) to a combiner (COMB) included in said head-end (HE), said combiner (COMB) being adapted to combine said plurality of downstream signals (Sd1, Sd2, Sd3, . . . ) together into a downstream modulated signal (S-MOD) which is broadcasted from said head-end (HE) to said plurality of terminals (T12, T12, T13, . . . , T31, . . . ), a first one (T12) of said plurality of terminals being coupled to a first one (TRX1) of said plurality of transceivers via an upstream link, said information being provided to said first terminal (T12) and concerning a filter frequency band being a first one (CH1) of said plurality of frequency bands (CH1, CH2, CH3, . . . ) to be used by said first terminal (T12) to filter out of said downstream modulated signal (S-MOD) a first regenerated downstream signal being associated to a first one (Sd1) of said downstream signals provided by said first transceiver (TRX1), characterized in that said head-end (HE) further includes:

a control signal generator means (GEN-C) included to generate at least one pilot tone control signal (Cp1i, Cp1j, Cp1k) which includes said information concerning said first frequency band (CH1) and to provide said at least one pilot tone control signal (Cp1i, Cp1j, Cp1k) to a network terminator (NT1) included in said communication access network and downstream coupled between said combiner (COMB) and said first terminal (T12) and to thereby enable said network terminator (NT1) to generate at least one pilot tone signal (P1i, P1j, P1k) which includes said information concerning said first frequency band (CH1) and to insert each pilot tone signal (P1i) of said at least one pilot tone signal (P1i, P1j, P1k) in said modulated downstream signal (S-MOD) within a predefined pilot tone frequency band (CHpi) of at least one pilot tone frequency band (CHp1i, CHp1j, CHp1k) and to thereby enable said first terminal (T12) to filter out of said downstream modulated signal (S-MOD) with a derived frequency band (CHd1i, CHd1j, CHd1k) which is derived of said at least one predefined pilot tone frequency band (CHp1i, CHp1j, CHp1k), said at least one pilot tone signal (Pi, Pj, Pk).

12. A first network terminator (NT1) for inclusion in a communication access network and adapted to provide information, said communication access network including a head-end (HE) which includes a plurality of transceivers (TRX1, TRX2, TRX3, . . . ) and which is downstream coupled to each one of said plurality of terminals (T12, T12, T13, . . . , T31, . . . ) via a downstream common link (Lc) and a tree-like distributive network, each one of said plurality of transceivers (TRX1, TRX2, TRX3, . . . ) being adapted to provide one of a plurality of downstream signals (Sd1, Sd2, Sd3, . . . ), in one of a plurality of frequency bands (CH1, CH2, CH3, . . . ) associated to said one of said plurality of transceivers (TRX1, TRX2, TRX3, . . . ) to a combiner (COMB) included in said head-end (HE), said combiner (COMB) being adapted to combine together said plurality of downstream signals (Sd1, Sd2, Sd3, . . . ) into a downstream modulated signal (S-MOD) which is broadcasted from said head-end (HE) to said plurality of terminals (T12, T12, T13, . . . , T31, . . . ), said first network terminator (NT1) being downstream coupled between said combiner (COMB) and a first terminal (T12), said first terminal (T12) being coupled to a first one (TRX1) of said plurality of transceivers via an upstream link, said information being provided to said first terminal (T12) and concerning a filter frequency band (CH1) being a first one of said plurality of frequency bands (CH1, CH2, CH3, . . . ) to be used by said first terminal (T12) to filter out of said modulated signal (S-MOD) a first regenerated downstream signal which is associated to a first one (Sd1) of said downstream signals provided by said first transceiver (TRX1), characterized in that said first network terminator (NT1) includes:

second generating means (GEN2) included to generate, upon receiving of at least one pilot tone control signal (Cp1i, Cp1j, Cp1k) including said information concerning said first frequency band (CH1) from said head-end (HE), at least one pilot tone signal (P1i, P1j, P1k) including said information concerning said first frequency band (CH1) for application to a network terminator modulator (NT-MOD) of each pilot tone signal (P1i) of said at least one pilot tone signal (P1i, P1j, P1k) in a predefined pilot tone frequency band (CHp1i) of at least one pilot tone frequency band (CHp1i, CHp1j, CHp1k)

said network terminator modulator (NT-MOD) coupled to said second generating means (GEN2) and to said first terminal (T12) included to modulate said at least one pilot tone signal (P1i, P1j, P1k) together with said downstream signals (Sd1, Sd2, Sd3, . . . ) into said downstream modulated signal (S-MOD) thereby enabling said terminal (T12), upon receiving of said downstream modulated signal (S-MOD) to filter out of said downstream modulated signal (S-MOD) with a derived frequency band (CHd1i, CHd1j, CHd1k) which is derived of said at least one predefined pilot tone frequency band (CHp1i, CHp1j, CHp1k), said at least one pilot tone signal (P1i, P1j, P1k).

13. The first network terminator (NT1) according to claim 12 and characterized in that said at least one pilot tone frequency band (CHp1i, CHp1j, CHp1k) is included in a predefined global pilot tone frequency band (CHp) which includes at least said at least one pilot tone frequency band (CHp1i, CHp1j, CHp1k) and which carries before said modulation of said network terminator modulator (NT-MOD) no signals and whereby said derived frequency band (CHd1i, CHd1j, CHd1k) used by said first terminal (T12) is substantially equal to said predefined global pilot tone frequency band (CHp).

14. The first terminal (T12) to receive information according to claim 8, characterized in that said derived frequency band (CHd1i, CHd1j, CHd1k) used by said first filter means (FILT1) of said first terminal (T12) substantially equals to a predefined global pilot tone frequency band (CHp), said predefined global pilot tone frequency band (CHp) being used by a network terminator (NT) included in said communication access network and being downstream coupled between said combiner (COMB) and said first terminal (T12) and enabled to insert, upon receiving of at least one pilot tone control signal (Cp1i, Cp1j, Cp1k) including said information concerning said first frequency (CH1) from said head-end (HE), at least one pilot tone signal (P1i, P1j, P1k) including said information concerning said first frequency band (CH1), in said downstream modulated signal (S-MOD), each pilot tone signal (P1i) of said at least one pilot tone signal (Pi, Pj, Pk) being inserted in a predefined pilot tone frequency band (CHp1i) of at least one pilot tone frequency band (CHp1i, CHp1j, CHp1k) and said at least one pilot tone frequency band (CHpi, CHpj, CHpk) being included in said predefined global pilot tone frequency band (CHp) which includes at least said at least one pilot tone frequency band (CHp1i, CHp1j, CHp1k).

* * * * *